United States Patent
Liu

(10) Patent No.: US 8,424,821 B2
(45) Date of Patent: Apr. 23, 2013

(54) BRACKET ASSEMBLY FOR MOUNTING ROOFTOP OBJECTS

(75) Inventor: Jun Liu, Camas, WA (US)

(73) Assignee: Sunmodo Corporation, Vancouver, WA (US)

( * ) Notice: Subject to any disclaimer, the term of this patent is extended or adjusted under 35 U.S.C. 154(b) by 153 days.

(21) Appl. No.: 13/098,320

(22) Filed: Apr. 29, 2011

(65) Prior Publication Data

US 2011/0272545 A1 Nov. 10, 2011

Related U.S. Application Data

(60) Provisional application No. 61/332,742, filed on May 7, 2010.

(51) Int. Cl.
*A47G 29/02* (2006.01)
*E04G 3/20* (2006.01)
*E06B 7/28* (2006.01)

(52) U.S. Cl.
USPC .......................................... 248/237; 52/462

(58) Field of Classification Search ............. 248/222.14, 248/237, 512, 535, 536, 48.1, 148; 52/545, 52/25, 537, 543, 547, 549, 478, 24, 26, 462, 52/463; 403/362, 388, 396
See application file for complete search history.

(56) References Cited

U.S. PATENT DOCUMENTS

| | | | | | |
|---|---|---|---|---|---|
| 2,439,061 | A | * | 4/1948 | Shur | 248/536 |
| 2,439,062 | A | * | 4/1948 | Shur | 248/536 |
| 2,439,063 | A | * | 4/1948 | Shur | 248/536 |
| 2,687,863 | A | * | 8/1954 | Vogt et al. | 248/515 |
| 2,731,225 | A | * | 1/1956 | Cayo | 248/536 |
| 2,879,961 | A | * | 3/1959 | Bertram | 248/48.1 |
| 3,660,482 | A | * | 5/1972 | Elizalde | 2/537 |

(Continued)

FOREIGN PATENT DOCUMENTS

AU 2004218599 4/2006
FR 28851171 A1 8/2004

(Continued)

OTHER PUBLICATIONS

"Solar Collector Corrugated Metal Roof Mounting Instructions", Mar. 2011, pp. 1-3, American Water Heaters, Johnson City, Tennessee.
"General Installation Manual for WinGreen Solar Module", internet site: http://wingreenpower.com/technology-6-2.asp, accessed on Apr. 11, 2011.

(Continued)

*Primary Examiner* — Nkeisha Smith
(74) *Attorney, Agent, or Firm* — Stone Creek Services LLC; Alan M Flum

(57) ABSTRACT

Disclosed is an apparatus for mounting equipment, such as solar panels, fans, air conditioning units, walkways, signage, facade, or ladders, on corrugated or ribbed metal roofs where the mounting apparatus attempts to provide a leak resistant and stable mounting structure for such equipment. The corrugated or ribbed metal roof includes one or more peak portions and one or more corresponding valley portions. The equipment-mounting apparatus engages the roof with one or more fasteners at least one peak portion and engages by valley portion through a transfer of force from the fastener at the peak portion without requiring additional fasteners to engage the valley portion.

7 Claims, 9 Drawing Sheets

U.S. PATENT DOCUMENTS

| | | | | |
|---|---|---|---|---|
| 3,985,324 A | * | 10/1976 | Larson | 248/220.42 |
| 5,152,107 A | | 10/1992 | Strickert | |
| 5,287,670 A | * | 2/1994 | Funaki | 52/544 |
| 5,715,640 A | * | 2/1998 | Haddock | 52/545 |
| 5,988,583 A | * | 11/1999 | Rhine | 248/536 |
| 6,536,729 B1 | | 3/2003 | Haddock | |
| 6,959,519 B2 | * | 11/2005 | Adriaansen | 52/537 |
| 7,703,256 B2 | * | 4/2010 | Haddock | 52/543 |
| 2002/0046536 A1 | * | 4/2002 | Hotta | 52/698 |
| 2004/0177582 A1 | * | 9/2004 | Adriaansen | 52/537 |

FOREIGN PATENT DOCUMENTS

| | | |
|---|---|---|
| GB | 2254865 A | 10/1992 |
| JP | 2002250103 A | 9/2002 |
| WO | 20100101475 A1 | 9/2010 |

OTHER PUBLICATIONS

"Assembly Systems for Photovoltaic Plants", Jan. 18, 2011, p. 6, Profiness, Germany.

"Roof Bracket—Corrugated", Jun. 22, 2010, RS Components, UK.

"Trapezoidal Roof PV Mounting System", Dec. 5, 2010, pp. 17 & 20, Gigabiz, Ltd., UK.

"S-5! The Right Way", Corru Bracket Brochure, Jun. 19, 2009, pp. 1-2, Metal Roof Innovations Ltd., Colorado Springs, CO.

"S-5! Installation Instructions", Sep. 22, 2008, pp. 1-2, Metal Roof Innovations, Colorado Springs, CO.

"Roof Rack Mounting", Sep. 20, 2007, p. 3, Alzone Pty Ltd, Australia.

* cited by examiner

BRACKET ASSEMBLY FOR MOUNTING ROOFTOP OBJECTS

This application claims benefit to U.S. Provisional Application No. 61/332,742 filed on May 7, 2010.

BACKGROUND

The present disclosure relates to an apparatus for mounting equipment, such as solar panels, fans, air conditioning units, walkways, signage, facade, or ladders, on corrugated or ribbed metal roofs while preventing water leakage into the roof.

Corrugated, or ribbed metal roof structures are found in commercial and residential applications. Mounting equipment on corrugated or ribbed metal roofs provides particular challenges. For example, corrugated and ribbed structures have peaks and valleys. The valleys become a major water pathway during rain making a leak-resistant mounting structure a challenge. The inherently uneven surface of the corrugated or ribbed roof makes mounting equipment structures with sufficient stability and durability to withstand the elements challenging in comparison to mounting equipment structures to flat roof structures.

For the forgoing reasons, there is a need for an apparatus for mounting equipment to corrugated or ribbed metal roofs provides a leak resistant and stable mounting structure for the equipment.

SUMMARY

The disclosure is directed to an apparatus for mounting equipment, that may include solar panels, fans, air conditioning units, walkways, signage, facade, or ladders, on corrugated or ribbed metal roofs that attempts to provide a leak resistant and stable mounting structure for such equipment. The corrugated or ribbed metal roof includes one or more corrugations or ribs. The corrugations or ribs include a high supporting profile or peak portion and a low supporting profile or valley portion. The apparatus includes a bracket. The bracket includes an upper portion and a two or more foot portions. The upper portion includes an aperture for receiving a threaded fastener for engaging and securing the upper portion to the peak portion of the rib or corrugation.

The bracket includes an equipment-mounting portion that extends upwardly away from the upper portion of the bracket. The bracket includes two or more foot portions configured to transfer a downward load force from the threaded fastener vertically through the foot portions to the valley portion surface. In one aspect, the foot portions can be coupled to the upper portion through a respective side portion. The side portion forms an obtuse angle with respect the upper portion. In one aspect, the transfer of force can be accomplished by the foot portions resting vertically against the valley portion of the corrugated or ribbed metal roof.

The equipment-mounting apparatus can engage one or more peak portions and two or more valley portions. In one aspect, the equipment-mounting portion includes one upper portion and two foot portions, the upper portion fastens to one peak portion of the corrugated or ribbed metal roof and engages through the transfer of force from the fastener two valley portions. In another aspect, the equipment-mounting portion includes two upper portions and three foot portions, each upper portion engages a peak portion of the corrugated or ribbed metal roof and each foot portion engages a valley portion. The bracket can further include a channel beneath the upper portion for receiving a sealing gasket. The sealing gasket can be positioned between each upper portion and a peak portion. The sealing gasket includes an aperture for receiving the fastener. The sealing gasket helps to prevent water from penetrating into the roof sheet metal.

In another aspect, the each foot is disposed to receive a channel-shaped gasket. The channel-shaped gaskets can be made from the rubber, plastic, or other insulating material that electronically insulates the bracket from the corrugated or ribbed metal roof to avoid the galvanic corrosion if the bracket and the corrugated or ribbed metal roof are made from two different metals.

One of the advantages of equipment-mounting apparatus in accordance with the invention is that they do not require fasteners that fasten the equipment-mounting apparatus either through the sides of the equipment-mounting apparatus or through the foot portions of the equipment-mounting apparatus. In addition, equipment-mounting apparatus in accordance with principles of the invention can transfer the majority of the force load from the fasteners to the foot portions. This can help to reduce leaks because the foot portions do not require fasteners and fasteners in the roof valley are especially susceptible to leakage since this is where water naturally pools.

DRAWINGS

These and other features, aspects, and advantages of embodiments in accordance with principles of the present invention will become better understood with regard to the following description, appended claims, and accompanying drawings where:

DESCRIPTION

Figure 1:
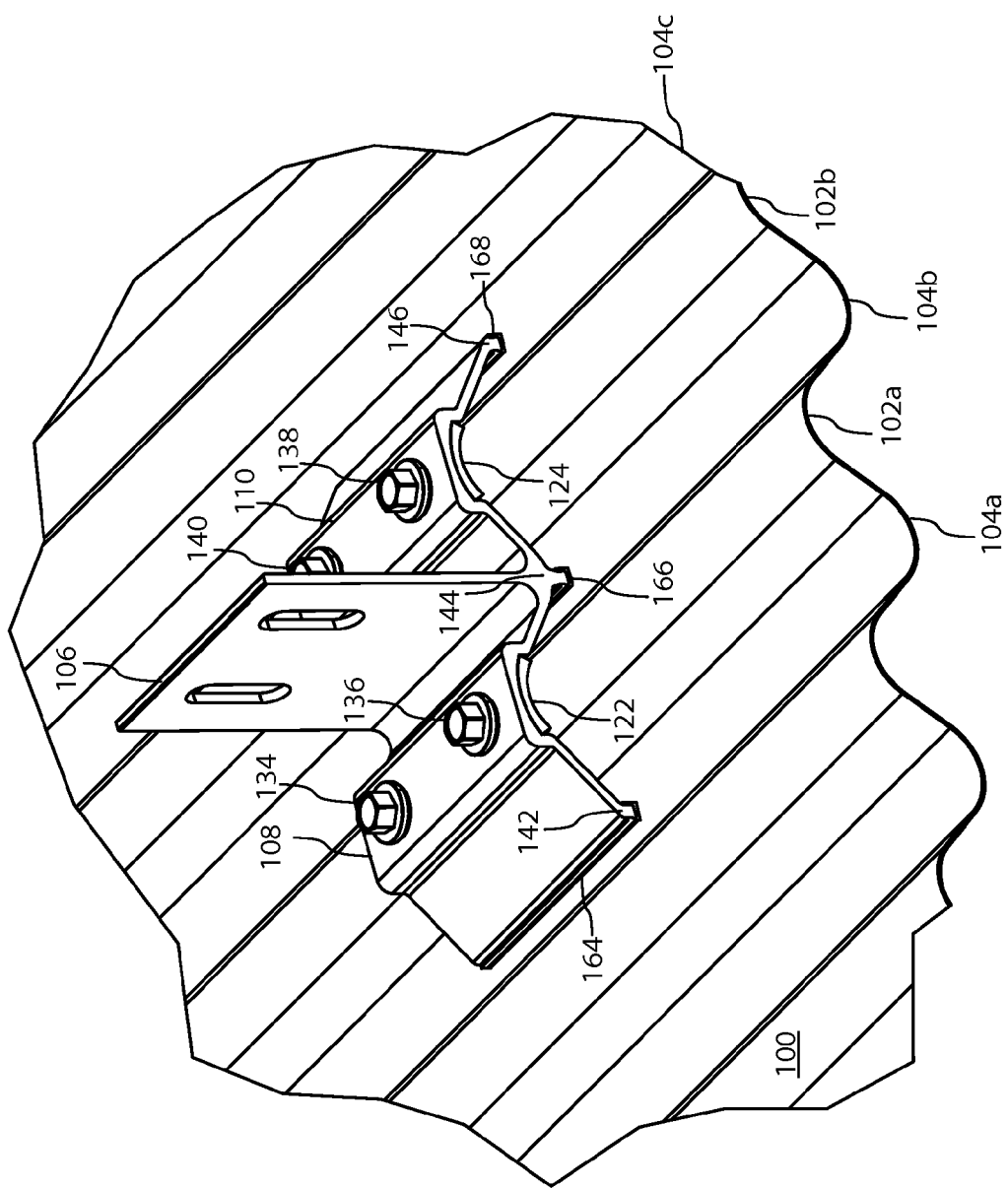
FIG. 1 shows a perspective view of an equipment-mounting apparatus, in accordance with principles of the invention, illustrated as installed on a corrugated metal roof.
Figure 2:
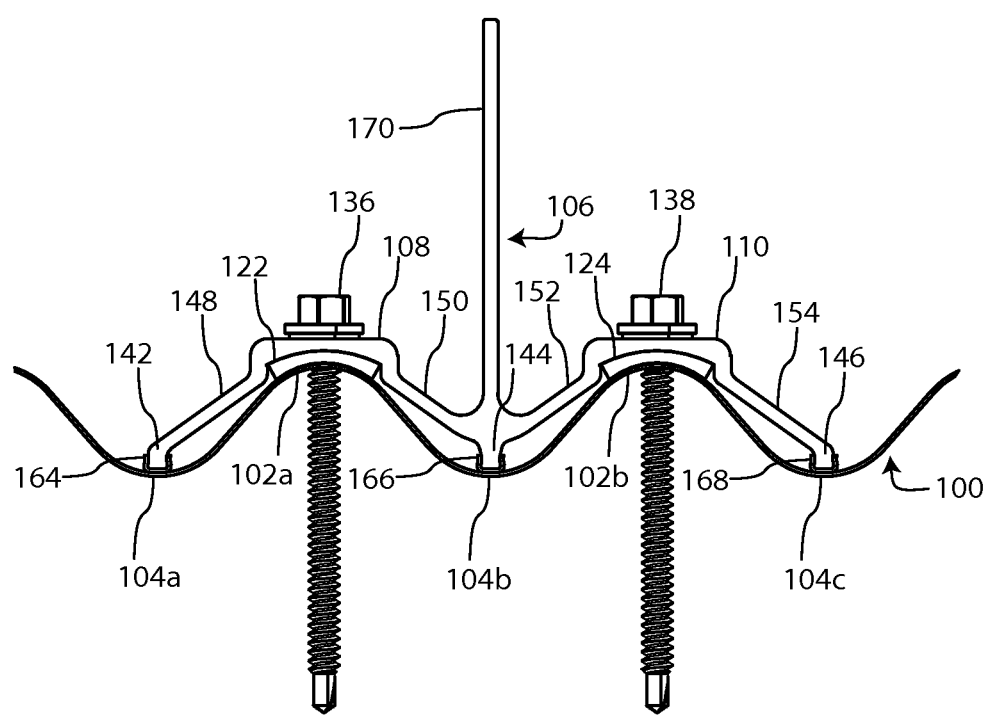
FIG. 2 shows a front view of an equipment-mounting apparatus of FIG. 1, illustrated as installed on a corrugated metal roof.
Figure 3:
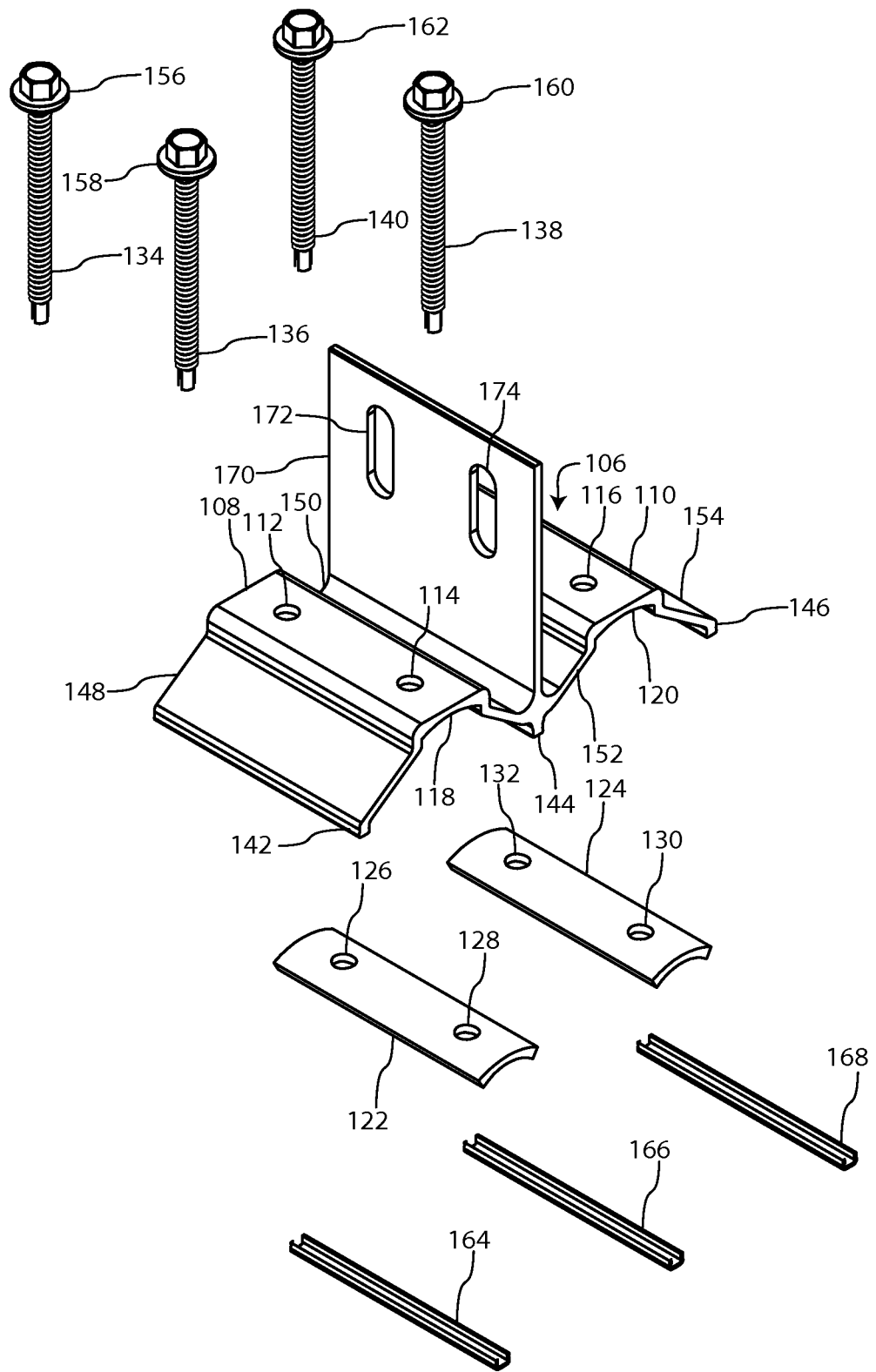
FIG. 3 shows an exploded view of the equipment-mounting apparatus of FIG. 1.
Figure 4:
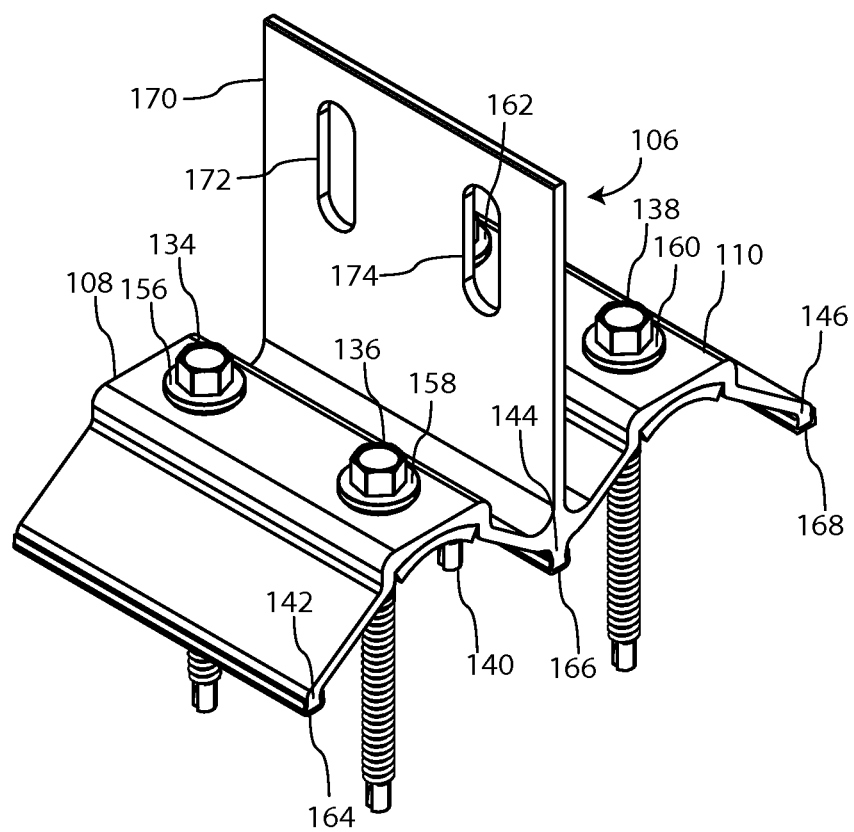
FIG. 4 shows a perspective view of the equipment-mounting apparatus of FIG. 1.

Referring now to the drawings in detail wherein like numerals indicate like elements throughout the several views, FIG. 1 shows a perspective view, and FIG. 2 a front view, of an equipment-mounting apparatus, in accordance with principles of the invention, illustrated as installed on a corrugated metal roof 100. FIG. 3 shows an exploded perspective view of the equipment-mounting apparatus of FIG. 1. FIG. 4 shows a perspective view of the equipment-mounting apparatus of FIG. 1.

Referring to FIGS. 1 and 2, the corrugated metal roof 100 includes one or more corrugations. Each corrugation includes a high supporting profile or peak portion and a low supporting profile or valley portion. Illustrated are a first peak portion 102a, a second peak portion 102b, a first valley portion 104a, a second valley portion 104b, and a third valley portion 104c. The apparatus includes a bracket 106. The bracket 106 can be made of metal or plastic. Referring to FIGS. 1-4, the bracket 106 has a first crown or first upper portion 108 and a second crown or second upper portion 110.

Referring to FIG. 3, the first upper portion 108 includes a first aperture 112, and a second aperture 114. The second upper portion 110 includes a third aperture 116 and a fourth aperture (not illustrated). The bottom side of the first upper portion 108 includes a first channel 118 and the bottom side of the second upper portion 110 includes a second channel 120. The first channel 118 is disposed to receive a first sealing gasket 122. The second channel 120 is disposed to receive a second sealing gasket 124. The first sealing gasket 122 includes a first aperture 126 and a second aperture 128. The second sealing gasket 124 includes a third aperture 130 and a fourth aperture 132. The first aperture 126 and second aperture 128 of the first sealing gasket 122 are positioned to align with the first aperture 112 and second aperture 114 respectively. Similarly, the third aperture 130 and the fourth aperture 132 of the second sealing gasket 124 are positioned to align with the third aperture 116 and the fourth aperture respectively.

The first upper portion 108 receives a first threaded fastener 134 through the first aperture 112 and second threaded fastener 136 the second aperture 114. The first sealing gasket 122 receives the first threaded fastener 134 through the first aperture 126 of the first sealing gasket 122 and receives the second threaded fastener 136 through the second aperture 128 of the first sealing gasket 122. Referring to FIGS. 1 and 2, the first threaded fastener 134 of FIG. 1, and the second threaded fastener 136 of FIGS. 1 and 2, fasten into the roof, compress the first sealing gasket 122 and thereby engage and secure the first upper portion 108 of the bracket 106 to the roof.

Referring to FIG. 3, the second upper portion 110 receives a third threaded fastener 138 through the third aperture 116 and a fourth threaded fastener 140 through the fourth aperture. The second sealing gasket 124 receives the third threaded fastener 138 through the third aperture 130 of the second sealing gasket 124 and receives the fourth threaded fastener 140 through the fourth aperture 132 of the second sealing gasket 124. The first threaded fastener 134, the second threaded fastener 136, the third threaded fastener 138, and the fourth threaded fastener 140 can be a wood screw, self-tapping metal screw, or a similar threaded fastener.

Referring to FIGS. 1 and 2, the third threaded fastener 138 of FIGS. 1 and 2, and fourth threaded fastener 140 of FIG. 1, fasten into the roof, compress the second sealing gasket 124 and thereby engage and secure the second upper portion 110 of the bracket 106 to the second peak portion 102b of the corrugated metal roof 100.

In FIG. 3, the first sealing gasket 122 and second sealing gasket 124 each include a top side that is arch-shaped in order to conform the shape of the first channel 118, second channel 120. Referring to FIG. 2, the first sealing gasket 122 and second sealing gasket 124 can be shaped to conform to the shape of the first peak portion 102a and the second peak portion 102b in order to help create a leak resistant seal. The shape of the channels and gaskets are exemplary; other shapes are possible as long the combination of channel, fastener, and gasket form a leak resistant seal between the corrugated metal roof 100 and the bracket 106.

Referring to FIG. 3, the first sealing gasket 122 and the second sealing gasket 124 can include an adhesive to affix then to the first channel 118 and the second channel 120 respectively. Referring to FIGS. 1 and 2, the first sealing gasket 122 and second sealing gasket 124 can be made from foam material such as ethylene propylene diene monomer (EDPM), or the like, that does not cause permanent deflection of the first peak portion 102a and the second peak portion 102b and provides a water resistant seal.

Referring to FIGS. 1-4, the bracket 106 includes a first foot portion 142, a second foot portion 144, and a third foot portion 146. Referring to FIGS. 2 and 3, the first foot portion 142 is joined to the first upper portion 108, through first side portion 148. The second foot portion 144 is joined to the first upper portion 108 through a second side portion 150. The first side portion 148 and second side portion 150 each form an obtuse angle with respect the first upper portion 108 in order to approximate the contour of the corrugation of the corrugated metal roof 100 of FIG. 2. Similarly, the third side portion 152 and fourth side portion 154 each form an obtuse angle with respect the first upper portion 108 in order to conform to the contour of the corrugation of the corrugated metal roof 100 of FIG. 2.

Referring to FIGS. 1 and 2, the first foot portion 142, the second foot portion 144, and the third foot portion 146 projects approximately vertically downward from the so that their profile is approximately normal or vertical with respect points of engagement at the roof at each respectively valley portion. Referring to FIG. 1, this configuration has the affect of transferring the majority of the downward load force from the first threaded fastener 134 and second threaded fastener 136 into the roof through the first foot 142 and second foot. Similarly, this configuration has the affect of transferring the majority of the downward load force from the third threaded fastener 138 and fourth threaded fastener 140 into the roof through the second foot 144 and the third foot 146.

Referring to FIGS. 3 and 4, the first threaded fastener 134 engages a first sealing washer 156 and the second threaded fastener 136 engages a second sealing washer 158 against the first upper portion 108 in order to prevent water from going through underneath the fastener heads. Similarly, the third threaded fastener 138 engages a third sealing washer 160 and the fourth threaded fastener 140 engages a fourth sealing washer 162.

The equipment mounting apparatus can be galvanically isolated from the metal roof by electrically insulating each foot portion from the corrugated metal roof 100 of FIG. 1. Referring to FIGS. 1-4, the first foot portion 142 is disposed to receive a first channel-shaped gasket 164, the second foot portion 144, is disposed to receive a second channel-shaped gasket 166, and the third foot portion 146 is disposed to receive a third channel-shaped gasket 168. The first channel-shaped gasket 164, the second channel shaped gasket 166, and third channel shaped gasket 168 can be made of plastic, rubber, or other insulating materials that provide galvanic isolation between the foot portions and the corrugated metal roof 100 of FIGS. 1 and 2. The first channel-shaped gasket 164, the second channel-shaped gasket 166, and the third channel-shaped gasket 168 have an interior portion shaped to surround the bottom the respective foot portion that they are paired with. Referring to FIGS. 1 and 2, the bottom surface of the first channel-shaped gasket 164, the second channel-shaped gasket 166, and the third channel-shaped gasket 168 can be flat on the bottom so that they engage their respective first valley portion 104a, second valley portion 104b, and third valley portion 104c tangent to the point of contact. Alternatively, the bottom surface of the first channel-shaped gasket 164, the second channel-shaped gasket 166, and the third channel-shaped gasket 168 can include other shapes that help maximize contact with the valley surface.

Referring to FIGS. 2-4, the bracket 106 includes an equipment-mounting portion 170 that upwardly projects from the body of the bracket 106. The equipment-mounting portion 170 originates between the first upper portion 108 and second upper portion 110. This configuration allows for the possibility of a balanced distribution of weight from the equipment and the first foot portion 142, the second foot portion 144, and the third foot portion 146. Referring to FIGS. 3 and 4, the equipment-mounting portion 170 includes a first equipment-mounting aperture 172 and a second equipment-mounting aperture 174. The equipment-mounting portion 170 can include one aperture or a plurality of apertures or other means for attaching equipment to the equipment-mounting portion 170, for example, a mechanical fastener, a mechanical clamp, a clip, or a hoop.

Figure 5:
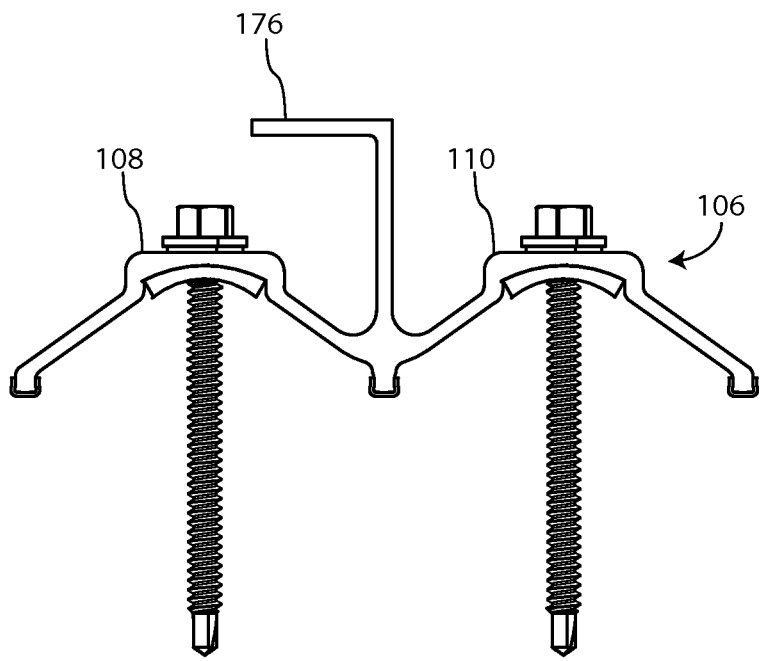
FIG. 5 shows a front view of a first alternative equipment-mounting apparatus in accordance with principles of the invention.
Figure 6:
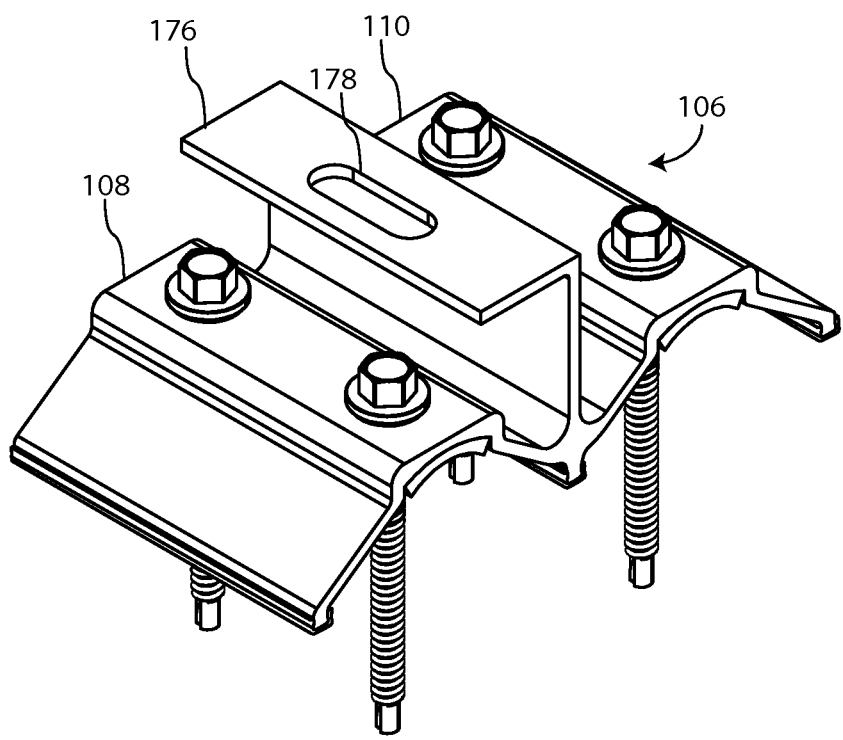
FIG. 6 shows a perspective view of the apparatus of FIG. 5.

Alternatively, the equipment-mounting portion can be shaped differently than the equipment-mounting portion 170 of the bracket 106. FIGS. 5 and 6 shows an equipment-mounting apparatus with similar features to the equipment-mounting apparatus disclosed and described for FIGS. 1-4, with an alternative equipment-mounting portion. Referring to FIGS. 5 and 6, show the bracket 106 including an L-shaped equipment-mounting portion 176. The L-shaped equipment-mounting portion 176 upwardly projects from the bracket 106 and is mounted between the first upper portion 108 and the second upper portion 110. The upper part of the L-shaped equipment-mounting portion 176 is approximately parallel to the tangent of the first upper portion 108 and the second upper portion 110. Referring to FIG. 6, the L-shaped equipment-mounting portion 176 includes an equipment-mounting aperture 178. The equipment-mounting aperture 178 is illustrated as one aperture. Alternatively, the L-shaped equipment-mounting portion 176 can include a plurality of apertures or other means for attaching equipment to the L-shaped equipment-mounting portion 176, for example, a mechanical fastener, a mechanical clamp, a clip, or a hoop.

Figure 7:
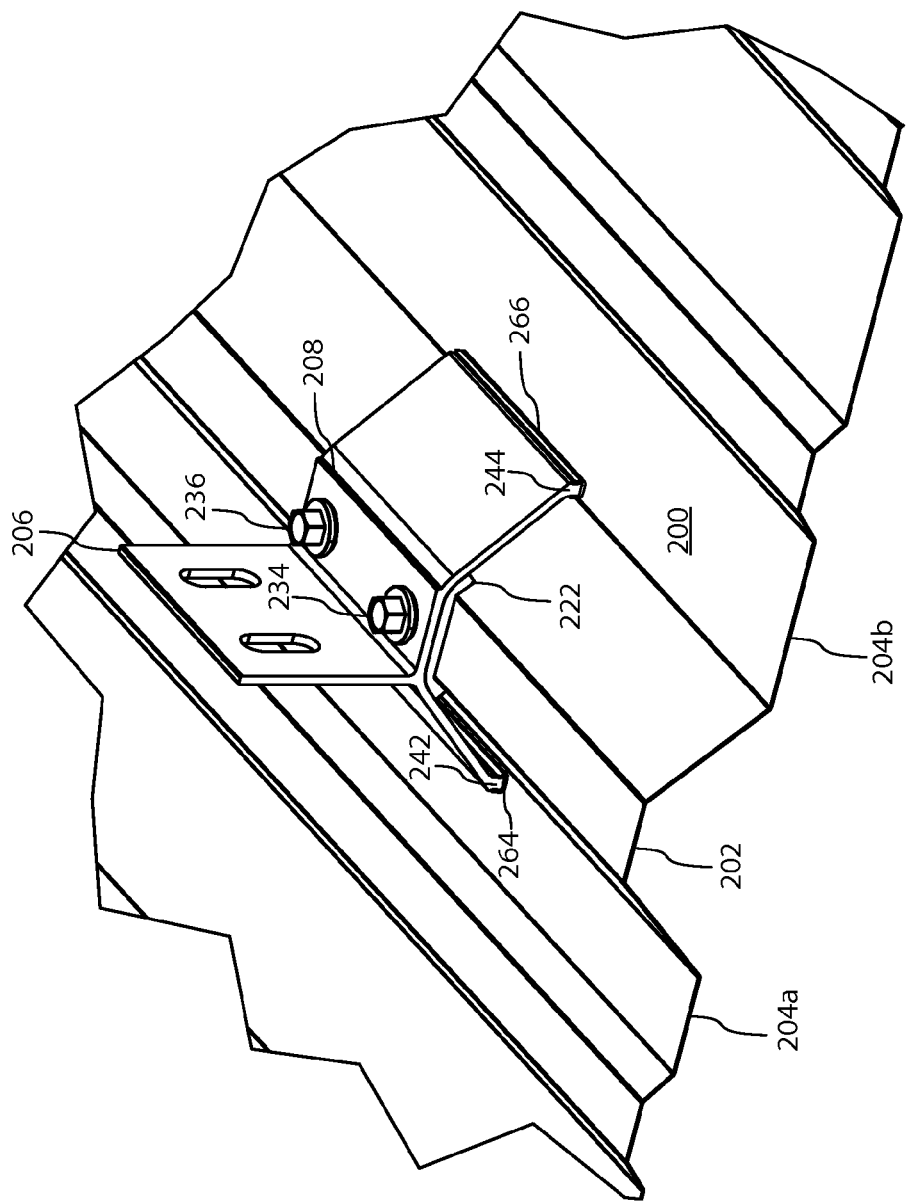
FIG. 7 shows a perspective view of a second alternative equipment-mounting apparatus in accordance with principles of the invention, illustrated as installed on a ribbed metal roof.
Figure 8:
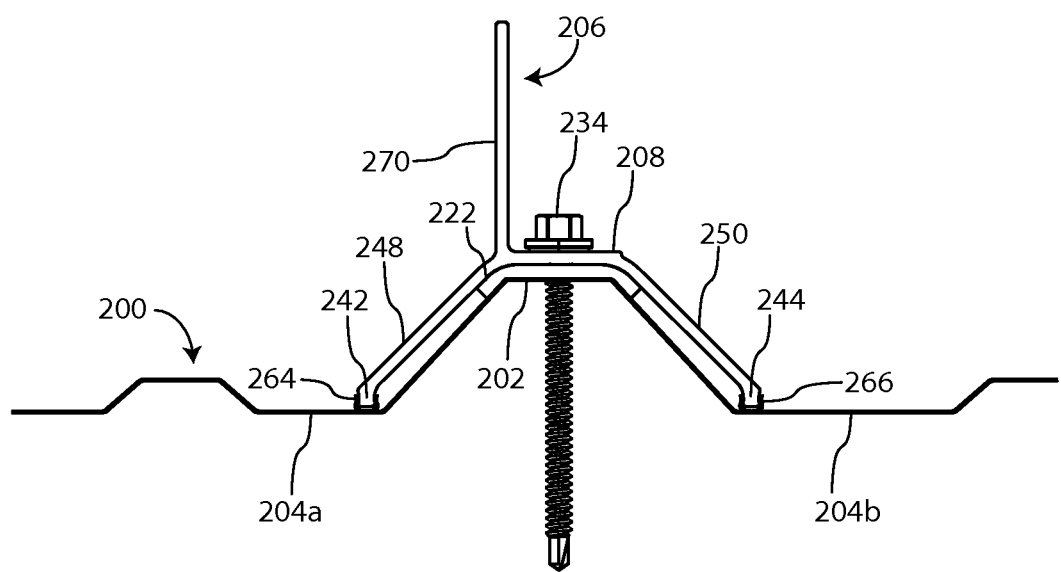
FIG. 8 shows a front view of the equipment-mounting apparatus of FIG. 7, illustrated as installed on a ribbed metal roof.
Figure 9:
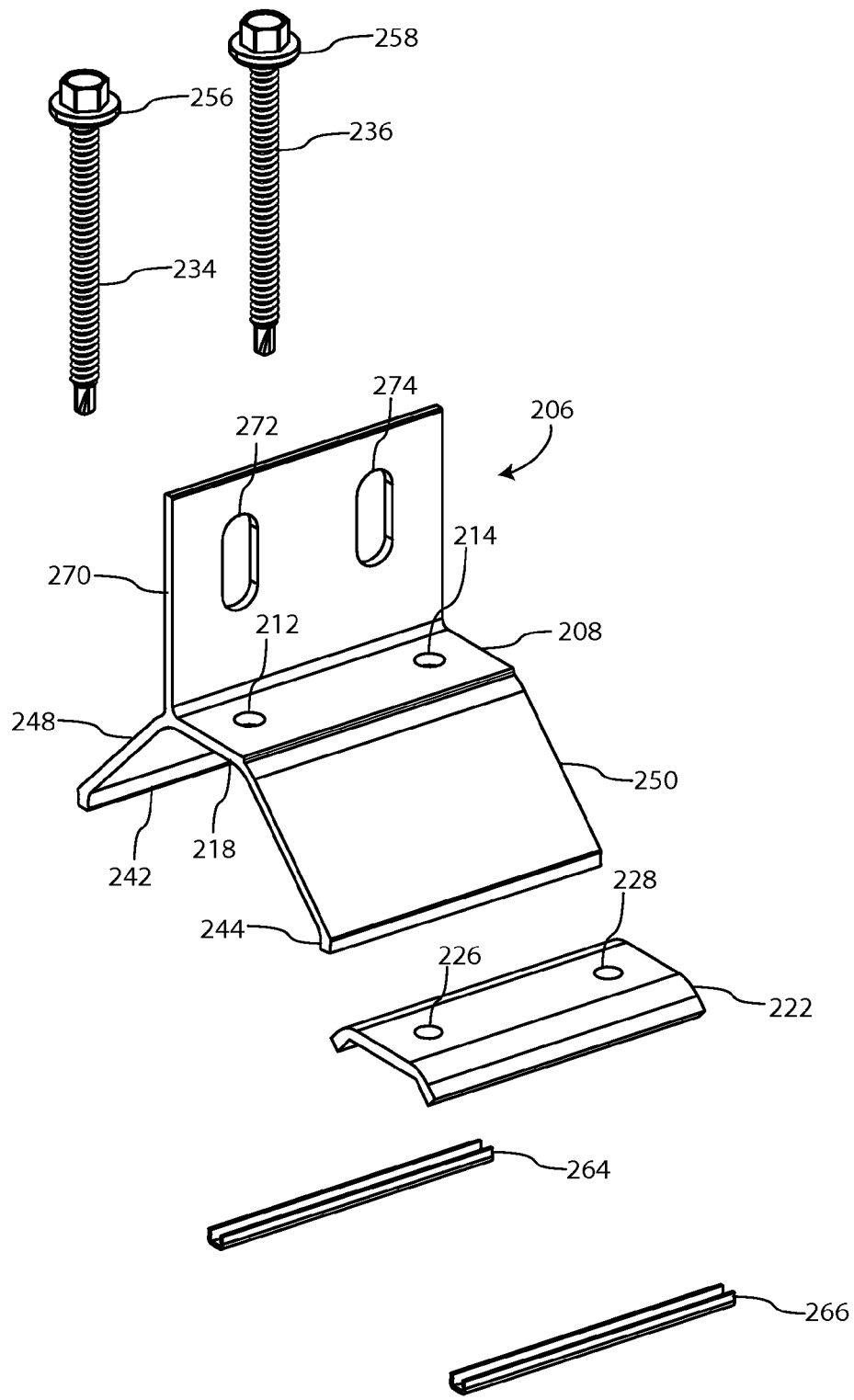
FIG. 9 shows an exploded view of the equipment-mounting apparatus of FIG. 7.

Alternatively, the equipment-mounting apparatus can be configured to mount across one peak and two valleys of a corrugated or ribbed metal roof. FIGS. 7-9 show an equipment-mounting apparatus configured to fasten to one peak and engage two valleys of a ribbed metal roof.

Referring to FIGS. 7 and 8, the ribbed metal roof 200 includes one or more ribs. Each rib includes a high supporting profile or peak portion and a low supporting profile or valley portion. Illustrated are a peak portion 202, a first valley portion 204a, and a second valley portion 204b. The apparatus includes a bracket 206. The bracket 206 can be made of metal or plastic. Referring to FIGS. 7-9, the bracket 206 has a crown or an upper portion 208.

Referring to FIG. 9, the upper portion 208 includes a first aperture 212, and a second aperture 214. The bottom side of the upper portion 208 includes a channel 218. The channel 218 is disposed to receive a sealing gasket 222. The sealing gasket 222 includes a first aperture 226 and a second aperture 228. The first aperture 226 and second aperture 228 of the sealing gasket 222 are positioned to align with the first aperture 212 and second aperture 214 respectively.

The upper portion 208 receives a first threaded fastener 234 through the first aperture 212 and second threaded fastener 236 the second aperture 214. The sealing gasket 222 receives the first threaded fastener 234 through the first aperture 226 of the sealing gasket 222 and receives the second threaded fastener 236 through the second aperture 228 of the sealing gasket 222. Referring to FIGS. 7 and 8, the first threaded fastener 234 of FIGS. 7 and 8, and second threaded fastener 236 of FIG. 7, fasten into the roof, compress the sealing gasket 222 and thereby engage and secure the upper portion 208 of the bracket 206 to the roof. The first threaded fastener 234 and the second threaded fastener 236 can be a wood screw, self-tapping metal screw, or similar threaded fastener. Those skilled in the art will readily recognize equivalent fasteners for attaching the bracket 206 to the ribbed metal roof 200.

In FIGS. 7-9, the sealing gasket 222 is trapezoidal shaped in order to conform the shape of the channel 218 of FIG. 9. Referring to FIGS. 7 and 8, the shape of the sealing gasket 222 can approximately conform to the shape of the peak portion 202 in order to help create a leak resistant seal. The shape of the channels and gaskets are exemplary; other shapes are possible as long the combination of channel, fastener, and gasket form a leak resistant seal between the ribbed metal roof 200 and the bracket 206.

Referring to FIG. 9, the sealing gasket 222 can include an adhesive to affix it to the channel 218. The sealing gasket 222 can be made from foam material such as ethylene propylene diene monomer (EDPM), or the like, to provide a water resistant seal that does not cause permanent deflection of the peak portion 202 of FIG. 2.

Referring to FIGS. 7-9, the bracket 206 includes first foot portion 242, and a second foot portion 244. Referring to FIGS. 8 and 9, the first foot portion 242 is joined to the upper portion 208, through first side portion 248. The second foot portion 244 is joined to the upper portion 208 through a second side portion 250. The first side portion 248 and second side portion 250 each form an obtuse angle with respect the upper portion 208 in order to conform to the contour of the ribs of the ribbed metal roof 200.

Referring to FIGS. 7-9, the first foot portion 242 and the second foot portion 244 projects approximately vertically downward from the bracket 206 so that their profile is approximately normal or vertical with respect points of engagement at the roof at each respectively valley portion. This configuration has the affect of transferring the majority of the downward load force from the first threaded fastener 234 and second threaded fastener 236 to the roof through the first foot 242 and second foot 244.

Referring to FIG. 9, the first threaded fastener 234 engages a first sealing washer 256 and the second threaded fastener 236 engages a second sealing washer 258 against the upper portion 208 in order to prevent water from going through underneath the fastener heads.

The equipment mounting apparatus can be galvanically isolated from the metal roof by electrically insulating each foot portion from the ribbed metal roof 200 of FIG. 7. Referring to FIGS. 7-9, the first foot portion 242 is disposed to receive a first channel-shaped gasket 264 and the second foot portion 244, is disposed to receive a second channel-shaped gasket 266. The first channel-shaped gasket 264 and the second channel shaped gasket 266 can be made of plastic, rubber, or other insulating materials that provide galvanic isolation between the foot portions and the ribbed metal roof 200 of FIG. 7. The first channel-shaped gasket 264 and the second channel-shaped gasket 266 have an interior portion shaped to surround the bottom the respective foot portion that they are paired with. Referring to FIGS. 7 and 8, the bottom surface of the first channel-shaped gasket 264 and the second channel-shaped gasket 266 can be flat on the bottom so that they engage their respective first valley portion 204a and second valley portion 204b tangent to the point of contact. Alternatively, the bottom surface of the first channel-shaped gasket 264 and the second channel-shaped gasket 266 can include other shapes that help maximize contact with the valley surface.

Referring to FIGS. 8 and 9, the bracket 206 includes an equipment-mounting portion 270 that upwardly projects from the body of the bracket 206. The equipment-mounting portion 270 originates on or near an edge of the upper portion 208. Referring to FIG. 9, the equipment-mounting portion 270 includes a first equipment-mounting aperture 272 and a second equipment-mounting aperture 274. The equipment-mounting portion 270 can include one aperture or a plurality of apertures or other means for attaching equipment to the equipment-mounting portion 270, for example, a mechanical fastener, a mechanical clamp, a clip, or a hoop.

Figure 10:
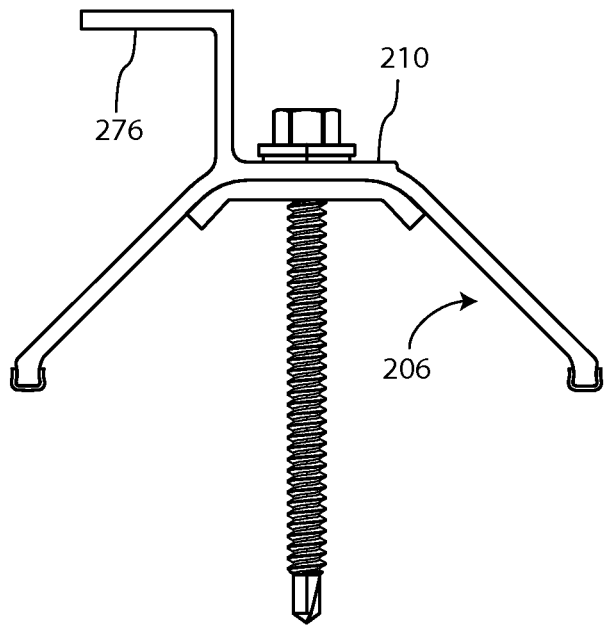
FIG. 10 shows a front view of the third alternative equipment-mounting apparatus in accordance with principles of the invention.
Figure 11:
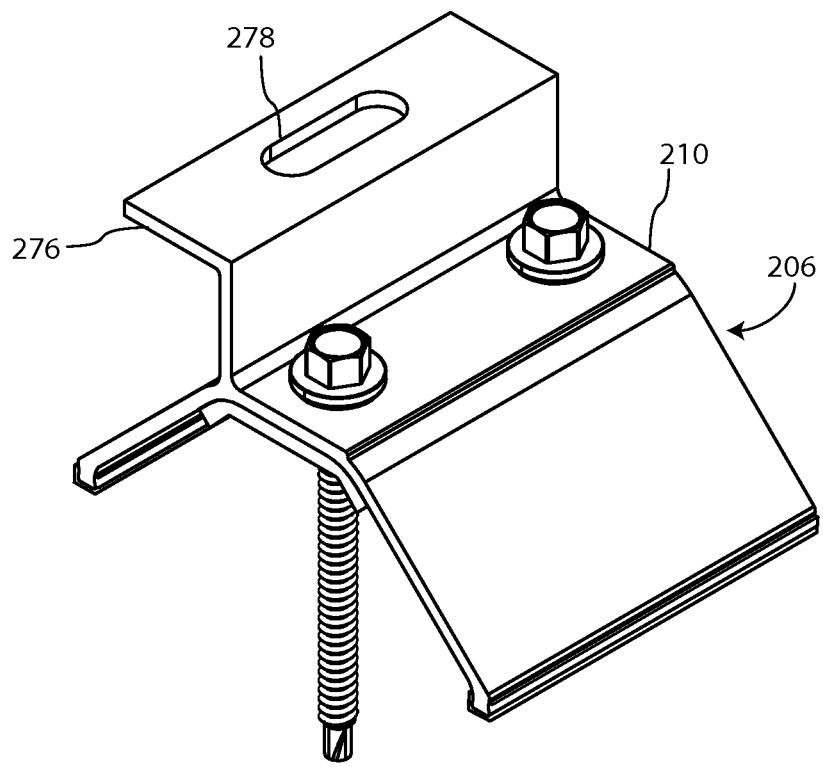
FIG. 11 an exploded view of the equipment-mounting apparatus of FIG. 10.

Alternatively, the equipment-mounting portion shaped differently that equipment-mounting portion 270 of the bracket 206. FIGS. 10 and 11 shows an equipment-mounting apparatus with similar features to the equipment-mounting apparatus disclosed and described for FIGS. 7-9, with an alternative equipment-mounting portion. Referring to FIGS. 10 and 11, show the bracket 206 including an L-shaped equipment-mounting portion 276. The L-shaped equipment-mounting portion 276 upwardly projects from the bracket 206 and is mounted to the upper portion 208 of the bracket 206. The upper part of the L-shaped equipment-mounting portion 276 is approximately parallel to the tangent of the upper portion 208 of the bracket 206. Referring to FIG. 11, the L-shaped equipment-mounting portion 276 includes an equipment-mounting aperture 278. The equipment-mounting aperture 278 is illustrated as one aperture. Alternatively, the L-shaped equipment-mounting portion 276 can include a plurality of apertures or other means for attaching equipment to the L-shaped equipment-mounting portion 276, for example, a mechanical fastener, a mechanical clamp, a clip, or a hoop.

The specification has described an equipment-mounting apparatus for mounting equipment, that may include solar panels, fans, air conditioning units, walkways, signage, facade, or ladders, on corrugated or ribbed metal roofs that attempts to provide a leak resistant and stable mounting structure for such equipment. It is not the intent of the inventor to limit the claimed invention to the examples, variations, and exemplary embodiments described in the specification. Those skilled in the art will recognize that variations will occur when embodying the claimed invention in specific implementations and environments. For example, it is possible to implement certain features described in separate embodiments in combination within a single embodiment. Similarly, it is possible to implement certain features described in single embodiments either separately or in combination in multiple embodiments. It is the intent of the inventor that these variations fall within the scope of the claimed invention. While the examples, exemplary embodiments, and variations are helpful to those skilled in the art in understanding the claimed invention, it should be understood that, the scope of the claimed invention is defined by the following claims and equivalents thereof.

What is claimed is:

1. An apparatus for mounting equipment to a metal roof, the metal roof including one or more corrugations or ribs with a peak portion and a valley portion, the apparatus comprising:
a bracket including an upper portion, the upper portion including an aperture for receiving a threaded fastener for engaging and securing the peak portion;
the bracket including an equipment-mounting portion extending upwardly away from the bracket;
the bracket including a plurality of foot portions, the plurality of foot portions including a first foot portion and a second foot portion extending vertically beneath the bracket, the plurality of foot portions not configured to receive roof securing fasteners, and configured to transfer a downward load force from the threaded fastener vertically through the foot portions to a corresponding valley portion; and
a first side portion joined between the upper portion and the first foot portion forming a first obtuse angle with the upper portion; and
a second side portion joined between the upper portion and the second foot portion forming a second obtuse angle with the upper portion.

2. The apparatus of claim 1 wherein the first side portion and second side portion are not configured to receive roof securing fasteners.

3. The apparatus of claim 1, further including:
a first channel-shaped gasket and a second channel-shaped gasket;
the plurality of foot portions include a first foot portion and a second foot portion;
the first channel-shaped gasket including a first interior portion configured to engage the first foot portion; and
the second channel-shaped gasket including a second interior portion configured to engage the second foot portion.

4. The apparatus of claim 3, further including:
the upper portion including a bottom side;
a sealing gasket including a top side and an aperture for receiving the threaded fastener; and
the top side of the sealing gasket is approximately shaped to conform to the bottom side of the upper portion.

5. An apparatus for mounting equipment to a metal roof, the metal roof including one or more corrugations or ribs with a peak portion and a valley portion, the apparatus comprising:
a bracket including an upper portion, the upper portion including an aperture for receiving a threaded fastener for engaging and securing the peak portion;
the bracket including an equipment-mounting portion extending upwardly away from the bracket;
the bracket including a plurality of foot portions extending vertically beneath the bracket, the plurality of foot portions including a first foot portion and a second foot portion, and the plurality of foot portions are not configured not to receive roof securing fasteners;
a first side portion joined between the upper portion and the first foot portion forming a first obtuse angle with the upper portion; and
a second side portion joined between the upper portion and the second foot portion forming a second obtuse angle with the upper portion.

6. The apparatus of claim 5, further including:
a first channel-shaped gasket and a second channel-shaped gasket;
the plurality of foot portions include a first foot portion and a second foot portion;
the first channel-shaped gasket including a first interior portion configured to engage the first foot portion; and
the second channel-shaped gasket including a second interior portion configured to engage the second foot portion.

7. The apparatus of claim 5 further including:
the upper portion includes a first upper portion and a second upper portion; and
the plurality of foot portions include a first foot portion adjacent to the first upper portion, a second foot portion between the first upper portion and the second upper portion, and a third foot portion adjacent to the second upper portion.

* * * * *